United States Patent
Iurissevich

(10) Patent No.: US 10,372,577 B2
(45) Date of Patent: Aug. 6, 2019

(54) MONITORING SYSTEM CONTROL UNIT COUPLED TO DEVICE DATABASE VIA THE INTERNET

(71) Applicant: Honeywell International Inc., Morristown, NJ (US)

(72) Inventor: Daniele Iurissevich, Trieste (IT)

(73) Assignee: Honeywell International Inc., Morris Plains, NJ (US)

( * ) Notice: Subject to any disclaimer, the term of this patent is extended or adjusted under 35 U.S.C. 154(b) by 633 days.

(21) Appl. No.: 14/644,362

(22) Filed: Mar. 11, 2015

(65) Prior Publication Data

US 2016/0267181 A1    Sep. 15, 2016

(51) Int. Cl.
| | |
|---|---|
| G06F 11/30 | (2006.01) |
| G06F 16/25 | (2019.01) |
| G06F 11/00 | (2006.01) |
| G06F 15/16 | (2006.01) |

(52) U.S. Cl.
CPC .............. *G06F 11/30* (2013.01); *G06F 11/00* (2013.01); *G06F 16/25* (2019.01)

(58) Field of Classification Search
CPC ..... G06F 11/30; G06F 17/30557; G06F 16/25
USPC ........................................................ 707/769
See application file for complete search history.

(56) References Cited

U.S. PATENT DOCUMENTS

| | | | | |
|---|---|---|---|---|
| 5,288,980 | A * | 2/1994 | Patel ...................... | G06K 17/00 235/380 |
| 6,598,790 | B1 * | 7/2003 | Horst ................... | G08B 13/246 235/375 |
| 8,837,805 | B1 * | 9/2014 | Aviyants .............. | G07D 7/2033 382/135 |
| 9,607,486 | B2 * | 3/2017 | Acker, Jr. ............ | G07G 1/0081 |
| 2002/0061758 | A1 * | 5/2002 | Zarlengo ................ | G01D 21/00 455/517 |
| 2008/0037856 | A1 * | 2/2008 | Paraskevakos ........ | G06Q 10/00 382/140 |
| 2012/0054049 | A1 * | 3/2012 | Hayes ................ | G06Q 20/0453 705/21 |
| 2014/0358777 | A1 * | 12/2014 | Gueh ................. | G06Q 20/3223 705/43 |
| 2015/0270961 | A1 * | 9/2015 | Barnett .................. | G06Q 10/00 713/189 |

* cited by examiner

*Primary Examiner* — Usmaan Saeed
*Assistant Examiner* — Brian E. Weinrich
(74) *Attorney, Agent, or Firm* — Brooks, Cameron & Huebsch, PLLC

(57) ABSTRACT

Information as to a group of devices which are part of a monitoring system, can be accumulated in one or more databases. The databases can be addressed via a computer network, such as the Internet. Monitoring systems can access one or more of the databases seeking identification of those devices that correspond to a selected criterion. A database can provide serial numbers of devices that meet the selected criteria. The respective monitoring system can determine if any local devices have serial numbers that match the received serial numbers. A trouble indicator can be generated in response thereto.

9 Claims, 3 Drawing Sheets

MONITORING SYSTEM CONTROL UNIT COUPLED TO DEVICE DATABASE VIA THE INTERNET

FIELD

The application pertains to alarm monitoring systems and methods wherein data pertaining to devices in such systems can be retrieved from a common database. More particularly, the application pertains to such systems and methods wherein pre-stored information concerning device status can be retrieved from a common database via a computer network such as the Internet.

BACKGROUND

Monitoring systems, to detect fire conditions, gas concentrations, or intruders into a premises are known and very useful. Such systems might each include dozens or hundreds of detectors or other monitoring devices. At times there is a need to locate various of the detectors or devices based on a specified parameter. For example, a specific batch of devices might need to be located. Batches might be defined by a specified manufacturing facility, date, design version or the like. Determining where the detectors or devices of interest are installed can be a very laborious and time consuming activity.

DETAILED DESCRIPTION

Figure 1:
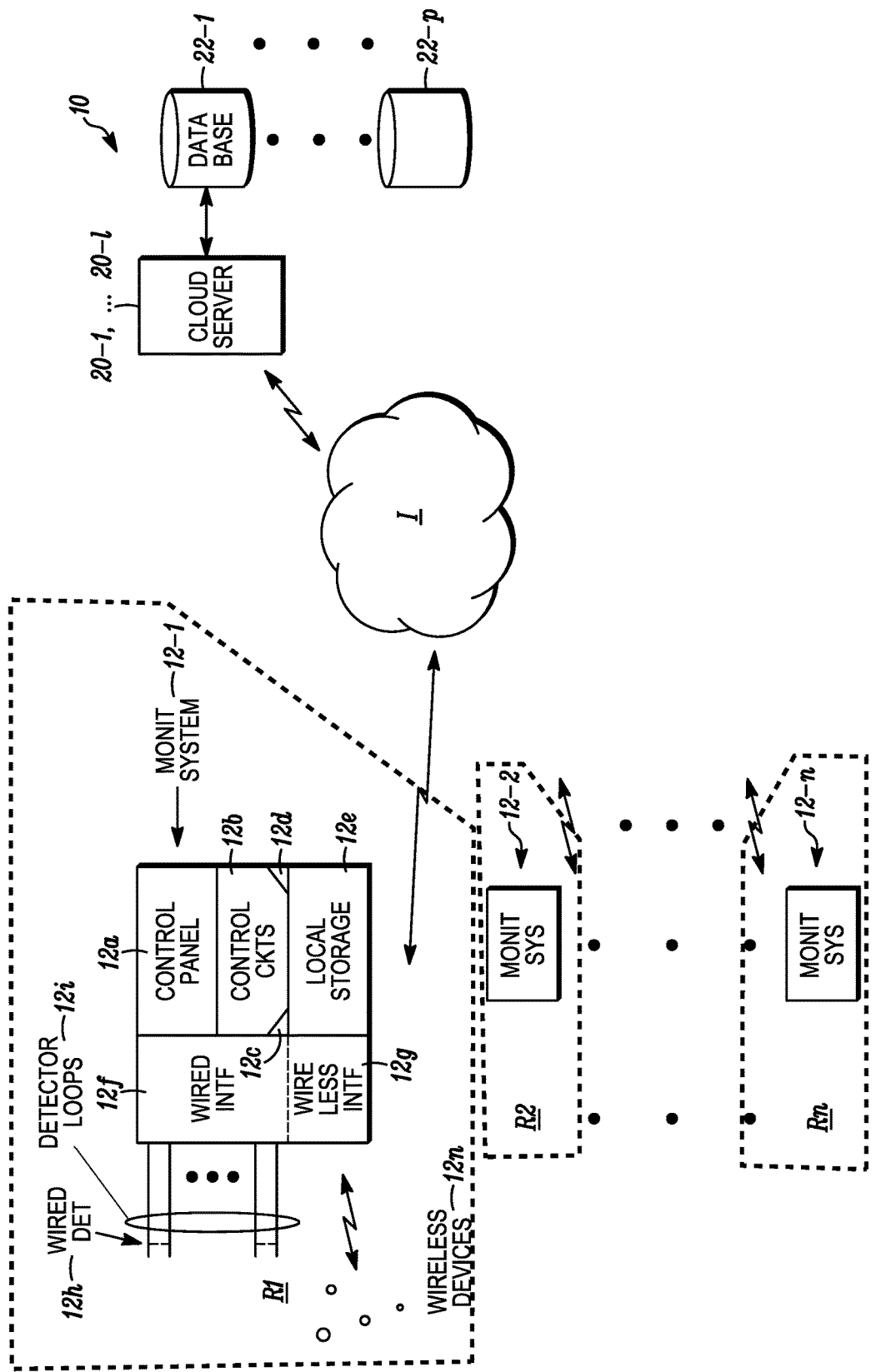
FIG. 1 illustrates a block diagram of a system in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

In one aspect, embodiments hereof can query a database for serial numbers of detectors or devices of interest, based on a specified criterion, which might have been installed in a particular monitoring system, or a plurality of monitoring systems. In response thereto, those serial numbers can be compared to the serial numbers of devices or detectors installed in a monitoring system. This process can be conducted substantially in parallel by each member of a plurality of monitoring systems.

For example, the database could have stored therein serial numbers of detectors or devices made at a designated plant, or in accordance with a particular design or revision to a design. Other possibilities include, without limitation, detectors with a particular month or year of manufacture, or those that exhibit predetermined quality characteristics. Serial numbers of detectors or devices with other types of characteristics, without limitation, can also be stored in a database.

In another aspect, control units, or control panels of monitoring systems can be in communication with the database via a computer network, such as the Internet. Based on a query from the control panel, one or more serial numbers of detectors or devices that fit the characteristics provided in the query can be automatically downloaded from the database to the control panel.

The control panel can then automatically compare the received serial numbers to those coupled to that control panel and determine which if any have a serial number that is the same as one of those received from the database. Detectors or devices with matching serial numbers can be identified for removal or other processing.

FIG. 1 illustrates a combination 10 in accordance herewith. The combination 10 includes a plurality of monitoring systems 12-1, 12-2 ... 12-n each of which is associated with a particular region, such as R1, R2 ... Rn being monitored. The regions need not be physically near one another.

System 12-1 is representative of the remaining systems 12-2 ... 12-n and a description of system 12-1 shall suffice as a description of the remaining systems as would be understood by those of skill in the art. System 12-1 includes a control unit, or panel 12a. Components of panel 12a include control circuits 12b which could be implemented at least in part by a programmed processor 12c and executable control instructions 12d. Circuits 12b are coupled to and communicate with local storage 12e which can store information including serial numbers, conditions of interest, lists of detectors and the like, all without limitation.

The control panel 12a can also include a wired interface for communicating with wired devices or detectors 12h which are coupled to the interface 12f by a plurality of detector wired loops 12i. The panel 12a can also include a wireless interface 12g. Interface 12g can provide wireless communications to a plurality of wireless devices 12n which without limitation could include various types of ambient condition detectors, thermostats, door and window monitoring units, all without limitation. The wireless interface 12g can also provide communication with one or more computer networks, for example via an Ethernet connection to the internet I.

The systems 12i function independently of one another but all are internet enabled either wirelessly, or by broadband cable and can communicate via the Internet I with one or more cloud servers such as 20-1 ... 20-1. The one or more cloud servers are in turn coupled to databases 22-1 ... 22-p. It will be understood that the servers 20-I and databases 22-I can be associated with different manufacturing sites. The database(s) can include information pertaining to detectors or devices, which can be automatically searched in response to a supplied key, parameter, or characteristic, all without limitation.

Figure 2:
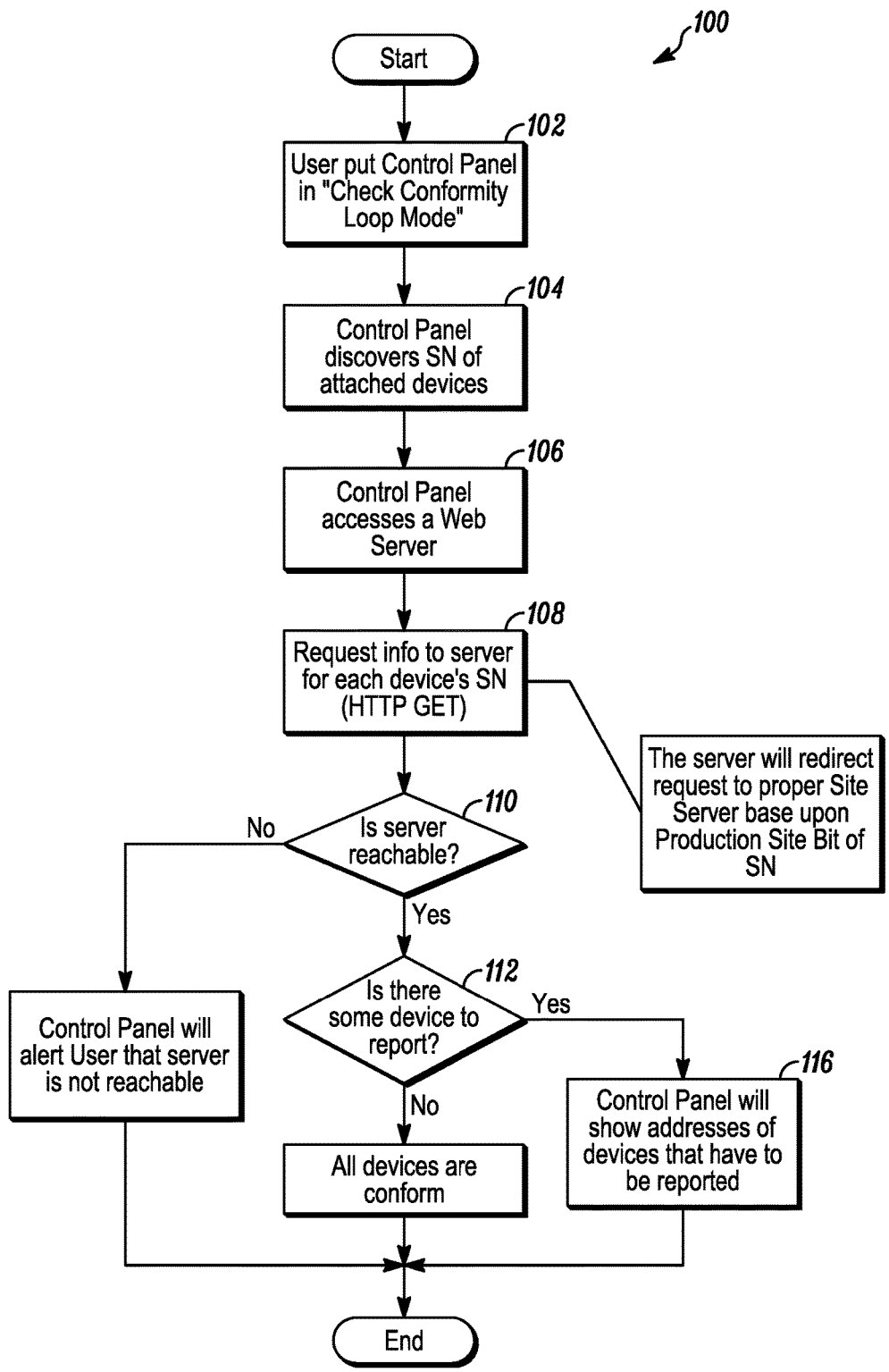
FIG. 2 is a flow chart which illustrates aspects of a method in accordance herewith.
Figure 3:
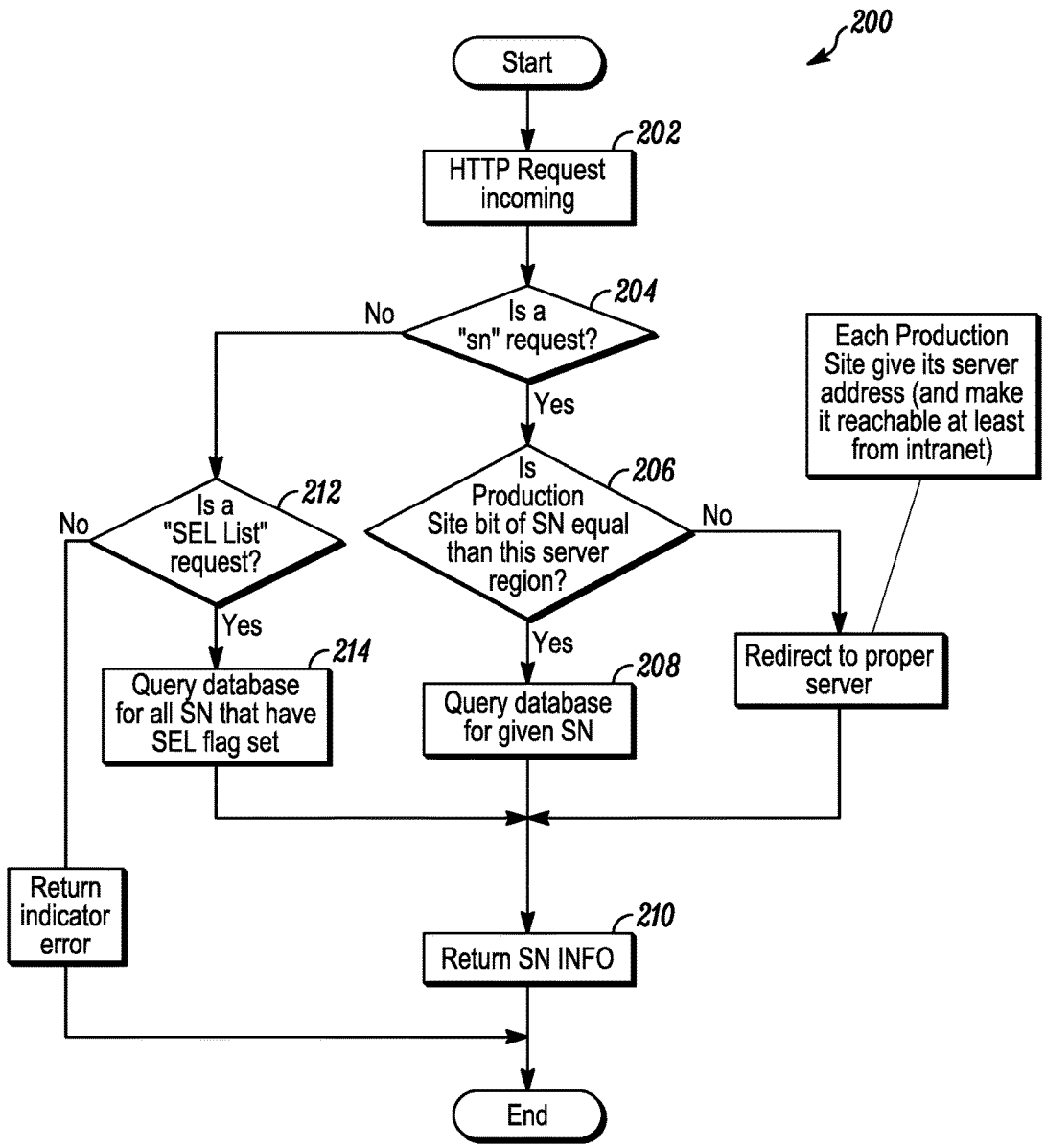
FIG. 3 is a flow chart which illustrates additional aspects of a method in accordance herewith.

FIGS. 2, 3 illustrate aspects of methods 100, 200 of operation of the system 12-1 in conjunction with a server 20-I and a database 22-i. It will be understood that while methods 100, 200 relate to determining if one or more detectors associated with panel 12a are in conformity with a predetermined condition, other conditions or criteria can be used to determine the locations and/or status of various of the detectors or devices such as 12h, or 12n all without limitation.

In FIG. 2, a user can put the control panel 12a of system 12-1 for example, into a mode to locate non-conforming detectors or devices, as at 102. The panel can determine the serial numbers of attached devices or detectors, as at 104.

A web server can be accessed by the panel, as at 106. The panel 12a can send a request to the database, such as 22-1, to identify non-conforming devices, as at 108.

Where the server is reachable, as at 110, the request is responded to and where there are non-conforming devices to report, as at 112, the control panel can specify addresses of local devices to be reported, as at 116.

In FIG. 3 processing 200 at the server 20-1 and database 22-1 is illustrated. An incoming request is received as at 202. The type of request is evaluated as at 204. If a serial number request is received, a determination is made, as at 206, as to the proper server to respond. The appropriate database is queried, as at 208. Information as to that serial number can be return to the control panel, for example panel 12a, as at 210.

Where serial numbers that might be collected on a specified list are requested, as at 212, the respective database is queried for all of the serial numbers that have a selected flag set, as at 214. The appropriate group of serial numbers can then be returned to the requesting panel, as at 210.

In summary, in embodiments hereof a control panel can access a displaced database for information, for example a group of serial numbers, which are associated with a predetermined parameter, condition or state, without limitation. That information can then be returned to the panel so that those detectors, or devices in the group and associated with that panel can be removed, tested or adjusted as needed. This process can be on-going, essentially simultaneously at a plurality of panels such as 12-1 . . . 12-n.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. A method comprising:
   receiving user input transitioning a control panel into a check conformity loop mode to identify whether any of a plurality of devices connected to the control panel have been identified as associated with a predetermined parameter, condition, or state;
   responsive to entering the check conformity loop mode, the control panel discovering a respective serial number for each of the plurality of devices;
   the control panel transmitting the respective serial number for each of the plurality of devices to a first of a plurality of cloud servers, each of the plurality of cloud servers being associated with a respective production site;
   the first of the plurality of cloud servers evaluating a respective production site bit of the respective serial number for each of the plurality of devices;
   the first of the plurality of cloud servers identifying a first group of serial numbers, the first group of serial numbers including the respective serial number for each of the plurality of devices for which the respective production site bit identifies the respective production site associated with the first of the plurality of cloud servers;
   the first of the plurality of cloud servers identifying a second group of serial numbers, the second group of serial numbers including the respective serial number for each of the plurality of devices outside of the first group of serial numbers;
   the first of the plurality of cloud servers identifying a set of the plurality of cloud servers for which the respective production site bit of the respective serial number for each of the plurality of devices within the second group of serial numbers matches the respective production site associated with a respective one of the set of the plurality of cloud servers;
   the first of the plurality of cloud servers forwarding the respective serial number for each of the plurality of devices within the second group of serial numbers to each of the set of the plurality of cloud servers;
   the first of the plurality of cloud servers and each of the set of the plurality of cloud servers obtaining, from a respective database, corresponding device serial numbers, wherein the corresponding device serial numbers include each respective serial number of each of the plurality of devices identified in the respective database of the first of the plurality of cloud servers and each of the set of the plurality of cloud servers as being associated with the predetermined parameter, condition, or state;
   the first of the plurality of cloud servers and each of the set of the plurality of cloud servers forwarding the corresponding device serial numbers to the control panel; and
   the control panel comparing the corresponding device serial numbers to the respective serial number for each of the plurality of devices and, responsive to results of the comparing, identifying for removal or other processing a group of the plurality of devices for which the respective serial number matches one of the corresponding device serial numbers.

2. The method as in claim 1 further comprising the control panel generating a list of a third group of the plurality of devices.

3. The method as in claim 1 further comprising the control panel signaling a trouble alarm as to the third group of the plurality of devices in response to the third group of the plurality of devices being non-compliant devices.

4. The method as in claim 1 wherein the control panel communicates with the first of the plurality of cloud servers via a computer network.

5. An apparatus comprising:
   a monitoring system that includes a control unit and a plurality of monitoring devices, wherein each of the plurality of monitoring devices communicates with the control unit;
   a plurality of cloud servers in communication with the control unit, each of the plurality of cloud servers associated with a respective production site; and
   a respective database of each of the plurality of cloud servers,
   wherein the control unit receives user input transitioning the control unit into a check conformity loop mode to identify whether any of the plurality of monitoring devices have been identified as associated with a predetermined parameter, condition, or state and, responsive thereto, discovers a respective serial number for each of the plurality of monitoring devices and transmits the respective serial number for each of the plurality of monitoring devices to a first of the plurality of cloud servers,
   wherein the first of the plurality of cloud servers evaluates a respective production site bit of the respective serial number for each of the plurality of monitoring devices and identifies a first group of serial numbers, wherein the first group of serial numbers includes the respective serial number for each of the plurality of monitoring devices for which the respective production site bit identifies the respective production site associated with the first of the plurality of cloud servers, wherein the first of the plurality of cloud servers identifies a second group of serial numbers, wherein the second group of serial numbers includes the respective serial number for each of the plurality of monitoring devices outside of the first group of serial numbers, wherein the first of the plurality of cloud servers identifies a set of the plurality of cloud servers for which the respective production site bit of the respective serial number for each of the plurality of monitoring devices within the second group of serial numbers matches the respective production site associated with a respective one of the set of the plurality of cloud servers and forwards the respective serial number for each of the plurality of monitoring devices within the second group of serial numbers to each of the set of the plurality of cloud servers, wherein the first of the plurality of cloud servers and each of the set of the plurality of cloud servers obtains, from the respective database, corresponding device serial numbers and forwards the corresponding device serial numbers to the control unit, wherein the corresponding device serial numbers include each respective serial number of each of the plurality of devices identified in the respective database of the first of the plurality of cloud servers and each of the set of the plurality of cloud servers as being associated with the predetermined parameter, condition, or state, and wherein the control unit compares the corresponding device serial numbers to the respective serial number for each of the plurality of monitoring devices and, responsive thereto, identifies for removal or other processing a group of the plurality of monitoring devices for which the respective serial number matches one of the corresponding device serial numbers.

6. The apparatus as in claim 5 wherein the control unit generates a list of a third group of the plurality of monitoring devices.

7. The apparatus as in claim 6 wherein output circuitry of the control unit emits trouble indicia indicating the group of the plurality of monitoring devices in response to the third group of the plurality of devices having to be removed from the monitoring system.

8. The apparatus as in claim 5 wherein each of the plurality of cloud servers is displaced from the control unit and communicates therewith via a computer network.

9. The apparatus as in claim 5 wherein the predetermined parameter, condition, or state is selected from a class that includes at least date of manufacture, location of manufacture, recall notices, design designation, product introduction date, and selected product materials.

* * * * *